(12) United States Patent
Aizawa (10) Patent No.: US 12,523,017 B2
(45) Date of Patent: Jan. 13, 2026

(54) EXCAVATION PLAN CREATION DEVICE, WORKING MACHINE, AND EXCAVATION PLAN CREATION METHOD

(71) Applicant: KOMATSU LTD., Tokyo (JP)

(72) Inventor: Masanori Aizawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 567 days.

(21) Appl. No.: 17/999,591

(22) PCT Filed: May 14, 2021

(86) PCT No.: PCT/JP2021/018324
§ 371 (c)(1),
(2) Date: Nov. 22, 2022

(87) PCT Pub. No.: WO2021/241258
PCT Pub. Date: Dec. 2, 2021

(65) Prior Publication Data
US 2023/0243130 A1 Aug. 3, 2023

(30) Foreign Application Priority Data
May 29, 2020 (JP) .................................. 2020-094297

(51) Int. Cl.
*E02F 9/26* (2006.01)
*E02F 3/43* (2006.01)
*E02F 9/22* (2006.01)

(52) U.S. Cl.
CPC .............. *E02F 9/262* (2013.01); *E02F 3/437* (2013.01); *E02F 9/2246* (2013.01)

(58) Field of Classification Search
CPC ......... E02F 9/262; E02F 3/437; E02F 9/2246; E02F 9/261; E02F 9/20; E02F 9/26; G06N 20/00; G06T 17/05; H04N 7/18
See application file for complete search history.

(56) References Cited

U.S. PATENT DOCUMENTS 5,461,803 A * 10/1995 Rocke ..................... E02F 3/437
701/50
5,493,798 A 2/1996 Rocke et al.
(Continued)

FOREIGN PATENT DOCUMENTS

| CN | 107532401 A | 1/2018 |
| CN | 108138459 A | 6/2018 |

(Continued)

*Primary Examiner* — Mussa A Shaawat
(74) *Attorney, Agent, or Firm* — GLOBAL IP COUNSELORS, LLP (57) ABSTRACT

An excavation plan creation device includes a storage unit configured to store a plurality of planning models each of which is a machine learning model that receives, as an input, terrain information and that outputs a planned value of an excavation trajectory and a swing direction. The planning models have performed machine learning with parameters related to soil quality which are different from each other. A soil quality estimation unit is configured to estimate soil quality. A terrain information acquisition unit is configured to acquire terrain information. A planned value calculation unit is configured to select the planning model on the basis of the soil quality estimated by the soil quality estimation unit, input the terrain information acquired by the terrain information acquisition unit to the selected planning model, and calculate the planned value as an output of the planning model.

9 Claims, 7 Drawing Sheets

(56) References Cited

U.S. PATENT DOCUMENTS

| | | | |
|---|---|---|---|
| 5,528,843 A * | 6/1996 | Rocke | E02F 3/434 701/50 |
| 5,603,059 A * | 2/1997 | Churchill | B07C 1/00 710/36 |
| 6,047,227 A * | 4/2000 | Henderson | E02F 9/2045 701/50 |
| 6,108,949 A * | 8/2000 | Singh | E02F 3/437 701/50 |
| 10,954,651 B2 * | 3/2021 | Hashimoto | E02F 9/205 |
| 11,250,300 B2 * | 2/2022 | Stanhope | G06F 18/241 |
| 11,840,822 B2 * | 12/2023 | Tanaka | E02F 9/2033 |
| 12,139,881 B2 * | 11/2024 | Matsuyama | E02F 9/2033 |
| 12,324,367 B2 * | 6/2025 | Schroeder | A01B 63/32 |
| 2005/0027420 A1 * | 2/2005 | Fujishima | E02F 9/2045 701/50 |
| 2009/0043462 A1 * | 2/2009 | Stratton | E02F 9/26 701/50 |
| 2009/0202109 A1 * | 8/2009 | Clar | E02F 9/261 382/104 |
| 2009/0219199 A1 * | 9/2009 | Borchert | G06T 17/05 342/357.31 |
| 2009/0326734 A1 * | 12/2009 | Gudat | E21F 17/18 701/2 |
| 2010/0245169 A1 * | 9/2010 | O'Connor | G01C 21/3826 342/357.25 |
| 2012/0330550 A1 * | 12/2012 | Jensen | G09B 25/08 702/5 |
| 2013/0006484 A1 | 1/2013 | Avitzur et al. | |
| 2015/0361642 A1 * | 12/2015 | Stratton | G05D 1/00 701/461 |
| 2016/0282878 A1 * | 9/2016 | Stratton | G09B 25/06 |
| 2017/0101761 A1 | 4/2017 | Wu | |
| 2018/0135273 A1 | 5/2018 | Tsuji | |
| 2018/0230671 A1 | 8/2018 | Wu | |
| 2018/0258608 A1 * | 9/2018 | Uetake | B65G 15/00 |
| 2020/0011029 A1 | 1/2020 | Sano et al. | |
| 2020/0032490 A1 * | 1/2020 | Ready-Campbell | E02F 9/262 |
| 2020/0394837 A1 * | 12/2020 | Hurd | G06T 7/521 |
| 2021/0034058 A1 * | 2/2021 | Subramanian | G06T 17/05 |
| 2021/0115643 A1 * | 4/2021 | Tanaka | E02F 9/265 |
| 2021/0148082 A1 * | 5/2021 | Suzuki | E02F 9/265 |
| 2022/0220709 A1 * | 7/2022 | Kamon | E02F 3/437 |
| 2023/0263083 A1 * | 8/2023 | Rains | G01N 9/24 172/133 |

FOREIGN PATENT DOCUMENTS

| | | |
|---|---|---|
| CN | 110382788 A | 10/2019 |
| EP | 3 733 977 A1 | 11/2020 |
| EP | 3 779 071 A1 | 2/2021 |
| JP | 8-49265 A | 2/1996 |
| JP | 11-247230 A | 9/1999 |
| JP | 2016-130409 A | 7/2016 |
| JP | 2016-169572 A | 9/2016 |
| JP | 2019-159727 A | 9/2019 |
| WO | 2019/131979 A1 | 7/2019 |
| WO | 2019/189888 A1 | 10/2019 |
| WO | 2020/049821 A1 | 3/2020 |
| WO | 2020/241419 A1 | 12/2020 |

\* cited by examiner

EXCAVATION PLAN CREATION DEVICE, WORKING MACHINE, AND EXCAVATION PLAN CREATION METHOD

CROSS-REFERENCE TO RELATED APPLICATIONS

This application is a U.S. National stage application of International Application No. PCT/JP2021/018324, filed on May 14, 2021. This U.S. National stage application claims priority under 35 U.S.C. § 119(a) to Japanese Patent Application No. 2020-094297, filed in Japan on May 29, 2020, the entire contents of which are hereby incorporated herein by reference.

TECHNICAL FIELD

The present disclosure relates to an excavation plan creation device, a work machine, and an excavation plan creation method.

BACKGROUND INFORMATION

Japanese Unexamined Patent Application H11-247230 discloses a method for determining a strategy capable of efficiently performing excavation processing and the like. In the method described in Japanese Unexamined Patent Application H11-247230, the division of an excavation area or the excavation order is determined in accordance with rules based on the experience and knowledge of a veteran operator. Further, when the optimal position and the orientation of a bucket are determined, the state of matter (for example, wet sand or unsolidified soil) is also considered in order to predict the resistance that the bucket encounters during excavation.

SUMMARY

Incidentally, work efficiency in an excavation plan can be defined by, for example, an excavated soil amount and work time. Among these, the excavated soil amount is determined by, for example, the amount of dug-out soil, the amount of spilled soil from the bucket after dig-out, and the amount of collapsed soil that collapses into the excavation site. These amounts of soil vary greatly depending on the soil quality (for example, sand or clay) of the excavation site.

In the method described in Japanese Unexamined Patent Application H11-247230, parameters related to soil quality are also considered to some extent, but there is a problem in that such consideration may not be sufficient because the division of the area and the determination of the excavation order are performed in accordance with certain rules.

The present disclosure has been made in view of the above circumstances, and an object of the present disclosure is to provide an excavation plan creation device, a work machine, and an excavation plan creation method capable of appropriately considering the influence of soil quality when creating an excavation plan.

In order to solve the afore-mentioned problem, one aspect of the present disclosure relates to an excavation plan creation device, including: a storage unit configured to store a plurality of planning models each of which is a machine learning model that receives, as an input, terrain information and that outputs a planned value of an excavation trajectory and a swing direction, the planning models having performed machine learning with parameters related to soil quality which are different from each other by using excavation efficiency as an evaluation value; a soil quality estimation unit configured to estimate soil quality; a terrain information acquisition unit configured to acquire terrain information; and a planned value calculation unit configured to select the planning model on the basis of the soil quality estimated by the soil quality estimation unit, input the terrain information acquired by the terrain information acquisition unit to the selected planning model, and calculate the planned value as an output of the planning model.

According to the present disclosure, it is possible to appropriately consider the influence of soil quality when creating an excavation plan.

DESCRIPTION OF EMBODIMENTS

Hereinafter, an embodiment of the present disclosure will be described with reference to the drawings. In each figure, the same reference numerals are used for the same or corresponding configurations, and the description thereof will be omitted as appropriate.

Figure 1:
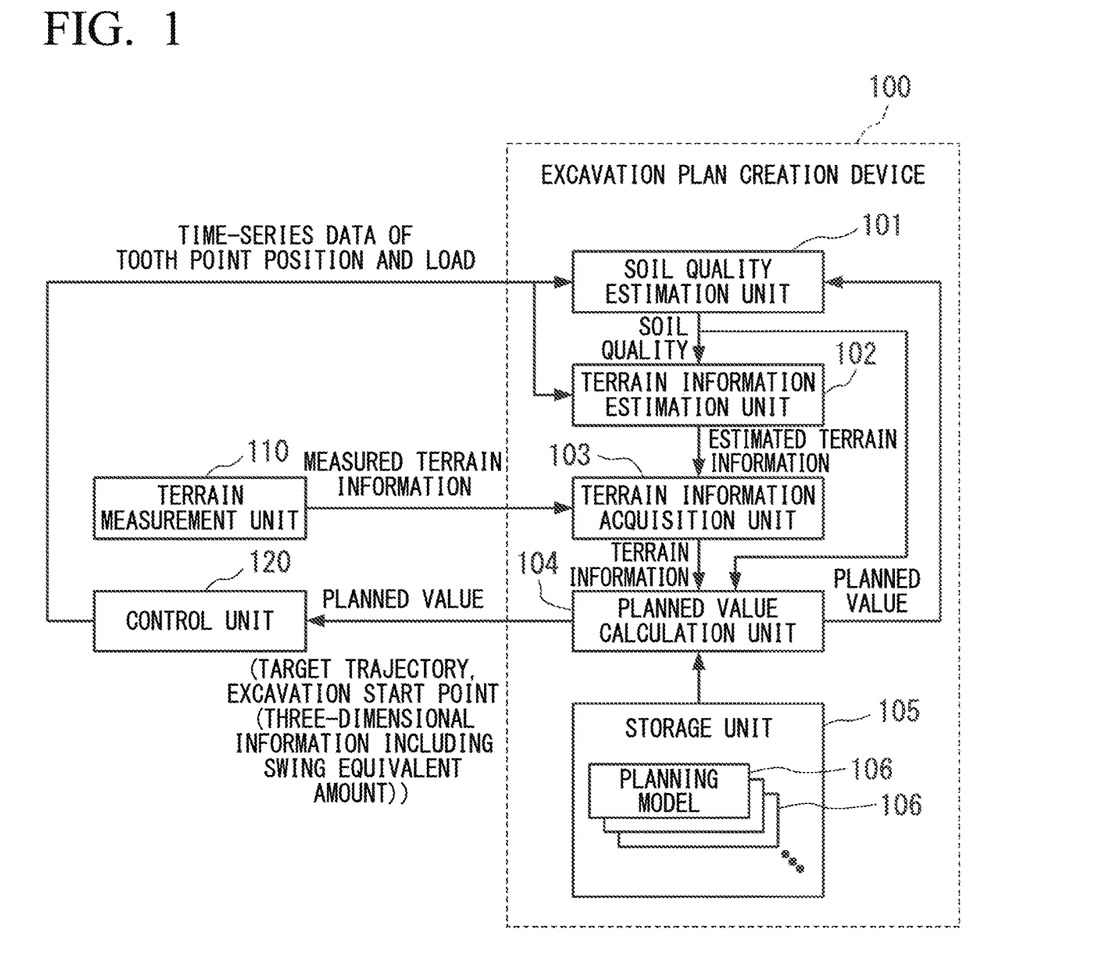
FIG. 1 is a block diagram showing a configuration example of an excavation plan creation device according to an embodiment of the present disclosure.
Figure 2:
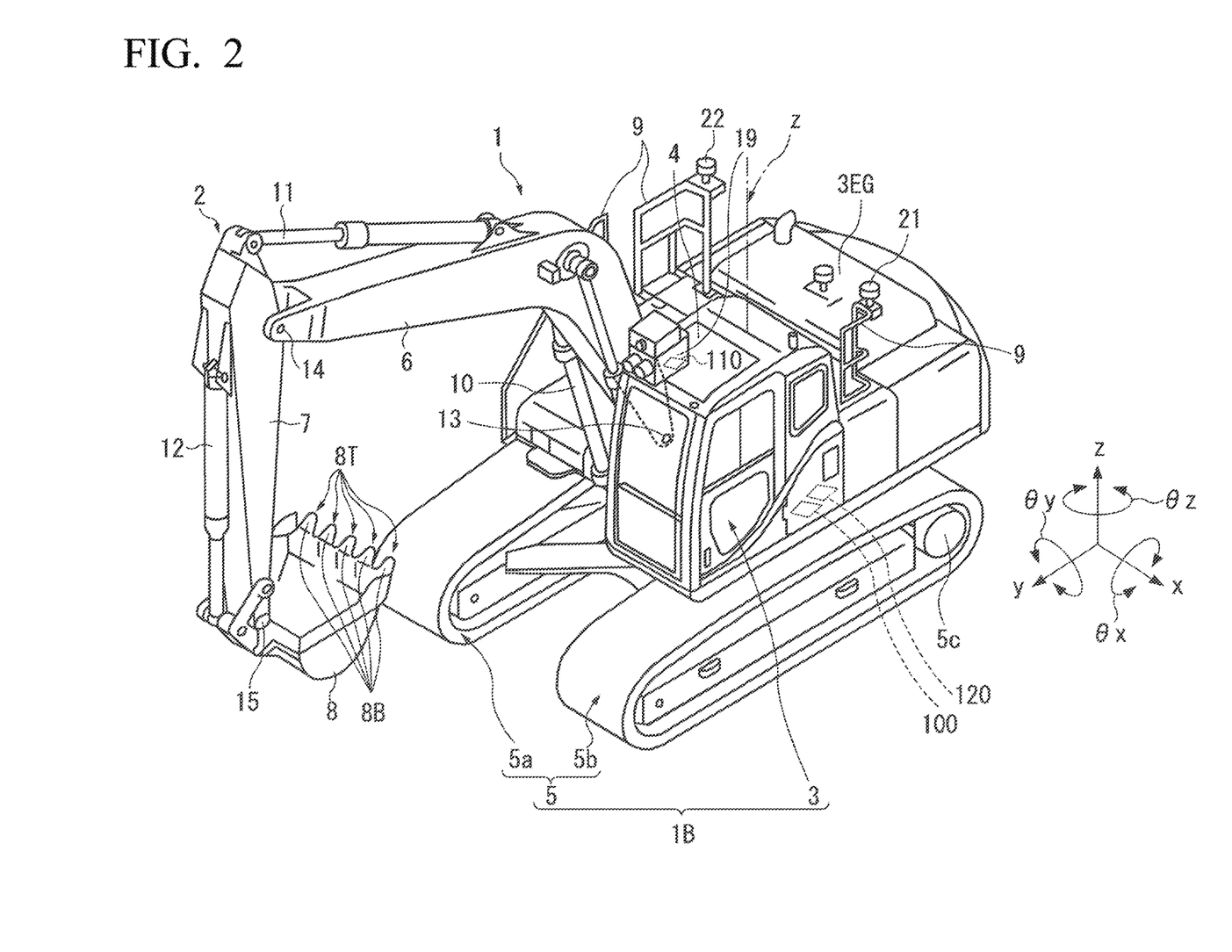
FIG. 2 is a perspective view showing a configuration example of a hydraulic excavator 1 as a work machine on which an excavation plan creation device 100 shown in FIG. 1 is mounted.

FIG. 1 is a block diagram showing a configuration example of an excavation plan creation device 100 according to an embodiment of the present disclosure. FIG. 2 is a perspective view showing a configuration example of a hydraulic excavator 1 as a work machine on which the excavation plan creation device 100 shown in FIG. 1 is mounted.

The excavation plan creation device 100 shown in FIG. 1 can be composed of, for example, a computer, such as a microcomputer and a field-programmable gate array (i.e., FPGA), or a computer and peripheral circuits or peripheral devices thereof. The excavation plan creation device 100 includes a soil quality estimation unit 101, a terrain information estimation unit 102, a terrain information acquisition unit 103, a planned value calculation unit 104, and a storage unit 105, as a functional configuration composed of a combination of hardware, such as a computer, peripheral circuits, and peripheral devices, and software, such as a program executed by the computer. The excavation plan creation device 100 of the present embodiment is mounted on, for example, a work machine (i.e., excavator), such as the hydraulic excavator 1, as shown in FIG. 2. The hydraulic excavator 1 includes the excavation plan creation device 100, a terrain measurement unit 110 that measures terrain information, and a control unit 120 that controls each unit of the hydraulic excavator 1, which are shown in FIG. 1.

The hydraulic excavator 1 shown in FIG. 2 has a vehicle body 1B as a body part and a work equipment 2. The vehicle body 1B has an upper swing body 3 which is a swing body and a traveling device 5 as an undercarriage. The upper swing body 3 houses an engine that is a power generation device and devices, such as a hydraulic pump, inside an engine room 3EG. In the embodiment, the hydraulic excavator 1 uses, for example, an internal combustion engine, such as a diesel engine, as the engine that is a power generation device, but the power generation device is not limited to the internal combustion engine. The power generation device of the hydraulic excavator 1 may be, for example, a so-called hybrid type device in which an internal combustion engine, a generator motor, and an electric power storage device are combined. Alternatively, the power generation device of the hydraulic excavator 1 may be a device in which an electric power storage device and a generator motor are combined without having an internal combustion engine.

The upper swing body 3 has a cab 4. In the example shown in FIG. 2, the cab 4 is installed on the upper swing body 3 on the side opposite to the side on which the engine room 3EG is disposed. Note that the positional relationship between the cab 4 and the engine room 3EG is not limited to this example. Handrails 9 are attached above the upper swing body 3.

The upper swing body 3 is mounted on the traveling device 5. The traveling device 5 has track shoes 5a and 5b. The traveling device 5 is driven by one or both of hydraulic motors 5c provided on the right and left. The track shoes 5a and 5b of the traveling device 5 rotate, whereby the hydraulic excavator 1 travels. The work equipment 2 is attached to the upper swing body 3 on the lateral side of the cab 4.

The hydraulic excavator 1 may include tires instead of the track shoes 5a and 5b, and may include a traveling device capable of transmitting the driving force of the engine to the tires via a transmission and traveling. As the hydraulic excavator 1 having such a form, for example, there is a wheel type hydraulic excavator. Alternatively, the hydraulic excavator 1 may be, for example, a backhoe loader having a structure in which a traveling device having such tires is provided, a work equipment attached to the vehicle body (i.e., body part) is further provided, and the upper swing body 3 and the swing mechanism thereof as shown in FIG. 2 are not provided. That is, the backhoe loader includes the work equipment attached to the vehicle body and the traveling device constituting a part of the vehicle body.

In the upper swing body 3, the side on which the work equipment 2 and the cab 4 are disposed is a front, and the side on which the engine room 3EG is disposed is a rear. The front-rear direction of the upper swing body 3 is a y direction. The left side facing the front is the left side of the upper swing body 3, and the right side facing the front is the right side of the upper swing body 3. The right-left direction of the upper swing body 3 is also referred to as a width direction or an x direction. In the hydraulic excavator 1 or the vehicle body 1B, the side of the traveling device 5 is a lower side with respect to the upper swing body 3 as a reference, and the side of the upper swing body 3 is an upper side with respect to the traveling device 5 as a reference. The up-down direction of the upper swing body 3 is a z direction. In a case where the hydraulic excavator 1 is installed on a horizontal plane, the lower side is a side of a vertical direction, that is, a side of a direction in which gravity acts, and the upper side is a side of a direction opposite to the vertical direction.

The work equipment 2 has a boom 6, an arm 7, a bucket 8 that is a work implement, a boom cylinder 10, an arm cylinder 11, and a bucket cylinder 12. The proximal end part of the boom 6 is attached to the front part of the vehicle body 1B via a boom pin 13 so as to be rotationally movable. The proximal end part of the arm 7 is attached to the distal end part of the boom 6 via an arm pin 14 so as to be rotationally movable. The bucket 8 is attached to the distal end part of the arm 7 via a bucket pin 15. The bucket 8 moves rotationally about the bucket pin 15. A plurality of teeth 8B are attached to the bucket 8 on the side opposite to the bucket pin 15. A tooth point 8T is the distal end of the tooth 8B.

The bucket 8 may not necessarily have the plurality of teeth 8B. That is, the bucket 8 may be a bucket of which the blade edge is formed in a straight shape by a steel plate without having the teeth 8B as shown in FIG. 2. The work equipment 2 may include, for example, a tilt bucket having a single blade. The tilt bucket means a bucket including a bucket tilt cylinder. The bucket tilts right and left so that the bucket can perform shaping or leveling of a slope or flat ground into a desired shape even when the hydraulic excavator is on a sloping surface, and the bucket can perform compaction using a bottom plate. In addition, the work equipment 2 may include, as a work implement, a slope finishing bucket, a rock breaking attachment including a rock breaking tip, or the like, instead of the bucket 8.

Each of the boom cylinder 10, the arm cylinder 11, and the bucket cylinder 12 shown in FIG. 2 is a hydraulic cylinder driven by the pressure of hydraulic oil discharged from a hydraulic pump. The boom cylinder 10 drives the boom 6 to be raised and lowered. The arm cylinder 11 drives the arm 7 to be rotationally moved around the arm pin 14. The bucket cylinder 12 drives the bucket 8 to be rotationally moved around the bucket pin 15.

Further, the work equipment 2 includes a first stroke sensor, a second stroke sensor, and a third stroke sensor (that is not shown). The first stroke sensor is provided in the boom cylinder 10, the second stroke sensor is provided in the arm cylinder 11, and the third stroke sensor is provided in the bucket cylinder 12. The first stroke sensor detects a boom cylinder length, which is a length of the boom cylinder 10, and outputs the boom cylinder length to the control unit 120. The second stroke sensor detects an arm cylinder length, which is a length of the arm cylinder 11, and outputs the arm cylinder length to the control unit 120. The third stroke sensor detects a bucket cylinder length, which is a length of the bucket cylinder 12, and outputs the bucket cylinder length to the control unit 120.

When the boom cylinder length, the arm cylinder length, and the bucket cylinder length are determined, a posture of the work equipment 2 is determined. Therefore, the first stroke sensor, the second stroke sensor, and the third stroke sensor, which detect these lengths, correspond to a posture detection device that detects the posture of the work equipment 2. The posture detection device is not limited to the first stroke sensor, the second stroke sensor, and the third stroke sensor, and may be an angle detector.

The control unit 120 calculates an inclination angle of the boom 6 with respect to a direction (i.e., z-axis direction) orthogonal to a horizontal plane in a local coordinate system, which is a coordinate system of the hydraulic excavator 1, from the boom cylinder length detected by the first stroke sensor. The control unit 120 also calculates an inclination angle of the arm 7 with respect to the boom 6, from the arm cylinder length detected by the second stroke sensor. The control unit 120 also calculates an inclination angle of the bucket 8 with respect to the arm 7, from the bucket cylinder length detected by the third stroke sensor. The inclination angles of the boom 6, the arm 7, and the bucket 8 are information indicating the posture of the work equipment 2.

Antennas 21 and 22 are attached to the upper part of the upper swing body 3. The antennas 21 and 22 are used to detect the current position of the hydraulic excavator 1. The antennas 21 and 22 are connected to the control unit 120 (or peripheral circuits thereof). The control unit 120 (or peripheral circuits thereof) receives radio waves from real time kinematic-global navigation satellite systems (i.e., RTK-GNSS, GNSS refers to a global navigation satellite system) by using antennas 21 and 22, and detects the current position of the hydraulic excavator 1. The signal corresponding to the GNSS radio wave received by the antennas 21 and 22 is input to the control unit 120, and the installation positions of the antennas 21 and 22 in the global coordinate system are calculated. An example of the global navigation satellite system includes a global positioning system (i.e., GPS), but the global navigation satellite system is not limited thereto.

As shown in FIG. 2, the antennas 21 and 22 are preferably installed on the upper swing body 3 at both ends separated from each other in the right-left direction, that is, in the width direction of the hydraulic excavator 1. In the embodiment, the antennas 21 and 22 are attached to the handrails 9 attached to both sides of the upper swing body 3 in the width direction. The positions where the antennas 21 and 22 are attached to the upper swing body 3 are not limited to the handrails 9, but it is preferable that the antennas 21 and 22 be installed at positions as far apart as possible from each other because the detection accuracy of the current position of the hydraulic excavator 1 is improved. Further, it is preferable that the antennas 21 and 22 be installed at positions where the operator's field of view is not obstructed as much as possible.

Further, the hydraulic excavator 1 includes an imaging device 19. The imaging device 19 is, for example, a stereo camera, and images, for example, a work target area of the hydraulic excavator 1 and outputs the captured image to the terrain measurement unit 110 provided in the imaging device 19. The terrain measurement unit 110 creates three-dimensional terrain information on the basis of a parallax image captured by the imaging device 19 and outputs the created terrain information to the excavation plan creation device 100, as measured terrain information. The imaging device 19 is installed, for example, above the cab 4 of the upper swing body 3. Note that the location where the imaging device 19 is installed is not limited to that above the driver's seat 4. For example, the imaging device 19 may be installed inside and above the cab 4. The terrain measurement unit 110 may create terrain information by using a three-dimensional laser range finder, a three-dimensional laser scanner, a three-dimensional distance sensor, or the like, in place of or together with the imaging device 19.

Returning to FIG. 1, the terrain measurement unit 110 creates the measured terrain information indicating three-dimensional terrain information, and outputs the measured terrain information to the excavation plan creation device 100, for example, for each predetermined cycle.

Figure 7:
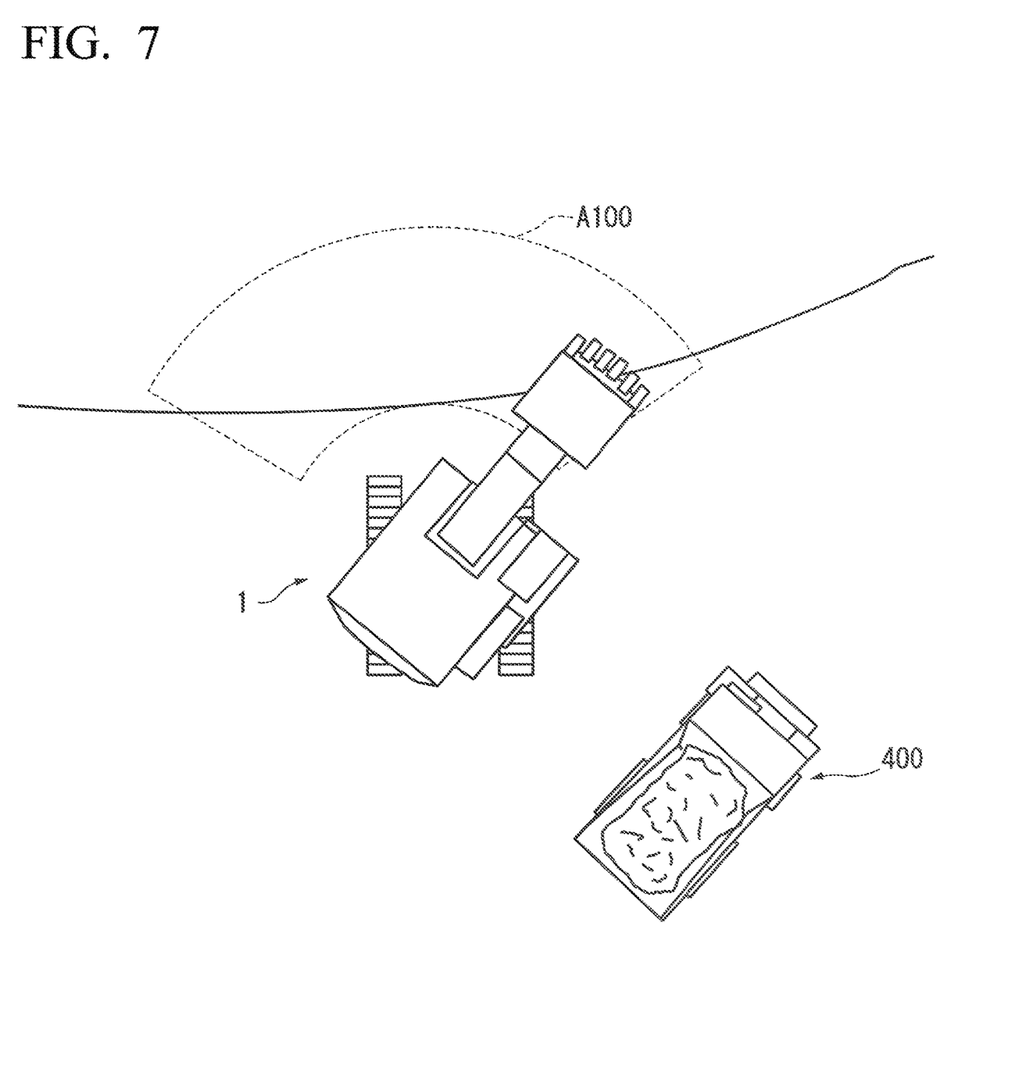
FIG. 7 is a plan view schematically showing an operation example of the hydraulic excavator 1 shown in FIG. 2.

Further, the control unit 120 receives, as an input, a planned value based on an excavation plan from the excavation plan creation device 100, to control the work equipment 2 and the upper swing body 3 and to output time-series data indicating the position (i.e., three-dimensional position) of the tooth point 8T and the load of the work equipment 2 to the excavation plan creation device 100. Here, the load of the work equipment 2 is generally measured by the cylinder pressure or the pump pressure. In the present embodiment, the load of the work equipment 2 can be represented by, for example, the load pressure of each of the cylinders 10 to 12, and includes the load during excavation (i.e., excavation load) and the load during non-excavation (i.e., during swing or the like). Further, the excavation load means excavation resistance. The excavation plan is, for example, a plan to excavate A100 within a certain range shown in FIG. 7 up to the target soil amount or the target terrain, and the planned value is information indicating an excavation trajectory and a swing direction, for example, three-dimensional information including a swing equivalent amount including data, such as a target trajectory and an excavation start point. FIG. 7 is a plan view schematically showing an operation example of the hydraulic excavator 1 shown in FIG. 2 (i.e., an operation example when excavating A100 within a certain range and loading an excavated object onto a dump truck 400).

Figure 4:
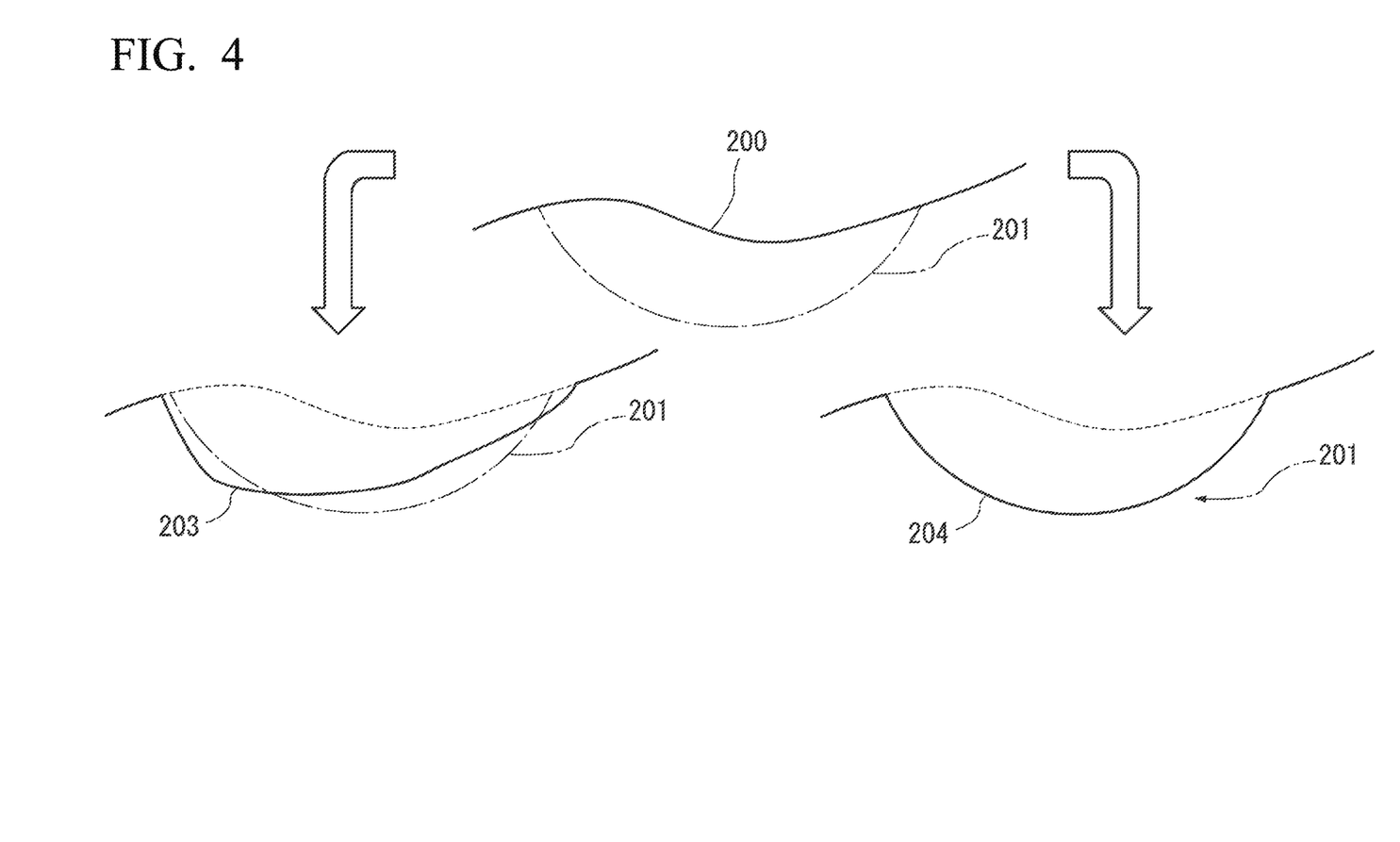
FIG. 4 is a schematic view describing an operation example of a soil quality estimation unit 101 shown in FIG. 1.

The soil quality estimation unit 101 receives, as an input, the time-series data indicating the tooth point position and the load input from the control unit 120 and the planned value calculated by the planned value calculation unit 104, which will be described later, and estimates soil quality on the basis of the deviation between the trajectory of the tooth point position (that is referred to as a planned trajectory) indicated by the planned value and an actual trajectory of the tooth point. In the present embodiment, the planned value is calculated on the basis of the estimation result of soil quality. Therefore, in a case where there is a difference between the estimated soil quality and the actual soil quality, the deviation between the planned trajectory and the actual trajectory tends to be large. For example, as shown in FIG. 4, in a case where the deviation between a planned trajectory 201 and an actual trajectory 203 is larger than the deviation between the planned trajectory 201 and an actual trajectory 204, it can be seen that the estimation result of the soil quality when the actual trajectory 203 is obtained has a larger difference between the estimated value and the actual value than the estimation result of the soil quality when the actual trajectory 204 is obtained. Therefore, for example, the soil quality estimation unit 101 can estimate that the actual soil quality is soil quality having higher excavation resistance than the estimated soil quality in a case where the actual trajectory is shallower than the planned value, and can estimate that the actual soil quality is soil quality close to the estimated soil quality in a case where the difference between the planned value and the actual trajectory is small, on the basis of the deviation between the planned trajectory and the actual trajectory of the tooth point position. The soil quality may be represented by, for example, the type, such as soil, sand, and clay, or may be represented by, for example, a value, such as excavation resistance or water content, or an index value based on the value. FIG. 4 is a schematic view describing an operation example of the soil quality estimation unit 101 shown in FIG. 1, and is a schematic cross-sectional view of an excavation surface 200, the planned trajectory 201, and the actual trajectories (examples) 203 and 204.

Figure 5:
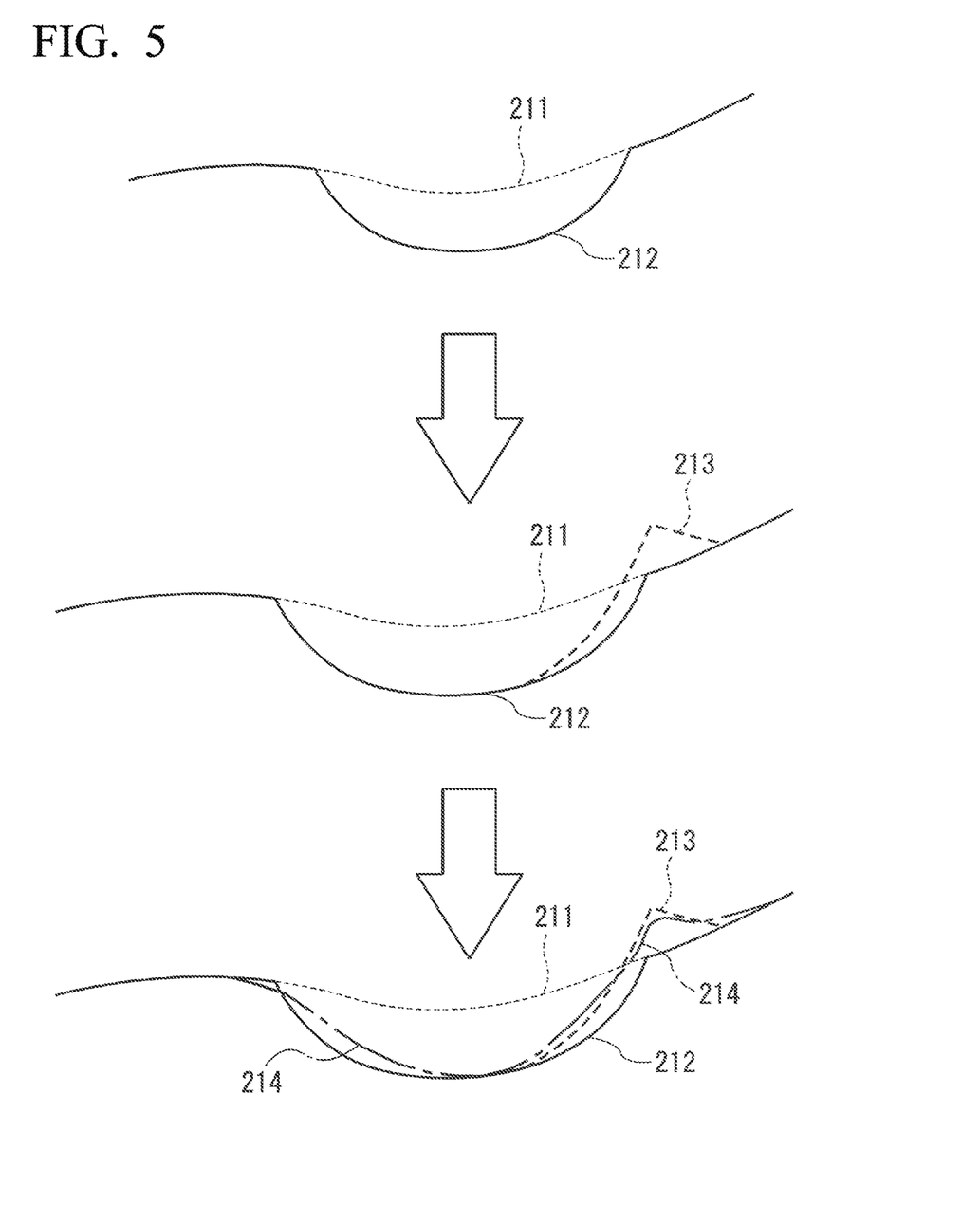
FIG. 5 is a schematic view describing an operation example of a terrain information estimation unit 102 shown in FIG. 1.

The terrain information estimation unit 102 receives, as an input, the time-series data indicating the tooth point position and the load input from the control unit 120 and the soil quality estimated by the soil quality estimation unit 101, estimates three-dimensional terrain information, and outputs the estimated three-dimensional terrain information to the terrain information acquisition unit 103 as estimated terrain information. The terrain information estimation unit 102 uses, for example, the measured terrain information acquired by the terrain information measurement unit 110 as an initial value (or a reference value) to estimate the terrain information on the basis of the time-series data indicating the tooth point position input from the control unit 120 and the soil quality estimated by the soil quality estimation unit 101. Alternatively, the terrain information estimation unit 102 may use, for example, terrain information created on the basis of a prior aerial image or the like as an initial value (or a reference value). In this case, for example, the terrain measurement unit 110 can be omitted. As shown in FIG. 5, for example, in a case where the actual trajectory of the tooth point during excavation is obtained as a trajectory 212 with respect to an excavation surface 211 before excavation, the terrain information estimation unit 102 assumes that a post-excavation terrain is equal to the excavation trajectory 212 (soil above the excavation trajectory 212 is removed). Next, the terrain information estimation unit 102 adds the estimated value of the amount of spilled soil from the bucket to the current terrain based on the trajectory 212 to obtain a terrain 213 after the addition. Next, the terrain information estimation unit 102 calculates a terrain 214 by applying smoothing through a moving average, assuming the amount of collapse. The amount of spilled soil and the amount of collapse can be set in, for example, a constant ratio with respect to the amount of dug-out soil, and the amount of spilled soil and the amount of collapse can be changed according to the soil quality. In addition, the moving average can be performed only on the periphery where the soil has changed. Since the terrain information is calculated as three-dimensional information, smoothing processing may be performed using, for example, a Gaussian filter or the like. FIG. 5 is a schematic view describing an operation example of the terrain information estimation unit 102 shown in FIG. 1, and is a cross-sectional view of the excavation surface 211, the actual trajectory (example) 212, and the estimated terrains 213 and 214.

The terrain information acquisition unit 103 receives (i.e., acquires), as an input, the measured terrain information and the estimated terrain information, selects the measured terrain information in a case where the measured terrain information can be normally acquired from the terrain measurement unit 110, and outputs the measured terrain information to the planned value calculation unit 104 as the terrain information. Alternatively, the terrain information acquisition unit 103 selects the estimated terrain information in a case where the measured terrain information cannot be normally acquired from the terrain measurement unit 110, and outputs the estimated terrain information to the planned value calculation unit 104 as the terrain information.

Meanwhile, the storage unit 105 stores a plurality of planning models 106. The plurality of planning models 106 are each a machine learning model that receives, as an input, terrain information and that outputs the planned value of the excavation trajectory and the swing direction when creating an excavation plan up to a target soil amount and a target terrain (for example, a slope shape after excavation) within a certain range with, for example, the work machine 1 as a reference, and are machine learning models that have performed machine learning with parameters related to the soil quality different from each other by using excavation efficiency as an evaluation value. The planning model 106 is, for example, a trained model having a neural network as an element, and a weighting coefficient between neurons in each layer of the neural network is optimized through machine learning such that desired solutions are output for a large number of input data. The planning model 106 is composed of, for example, a combination of a program for performing an arithmetic operation from input to output and a weighting coefficient (i.e., parameter) used for the arithmetic operation. Here, a learning method of the planning model 106 will be described with reference to FIG. 6.

Figure 6:
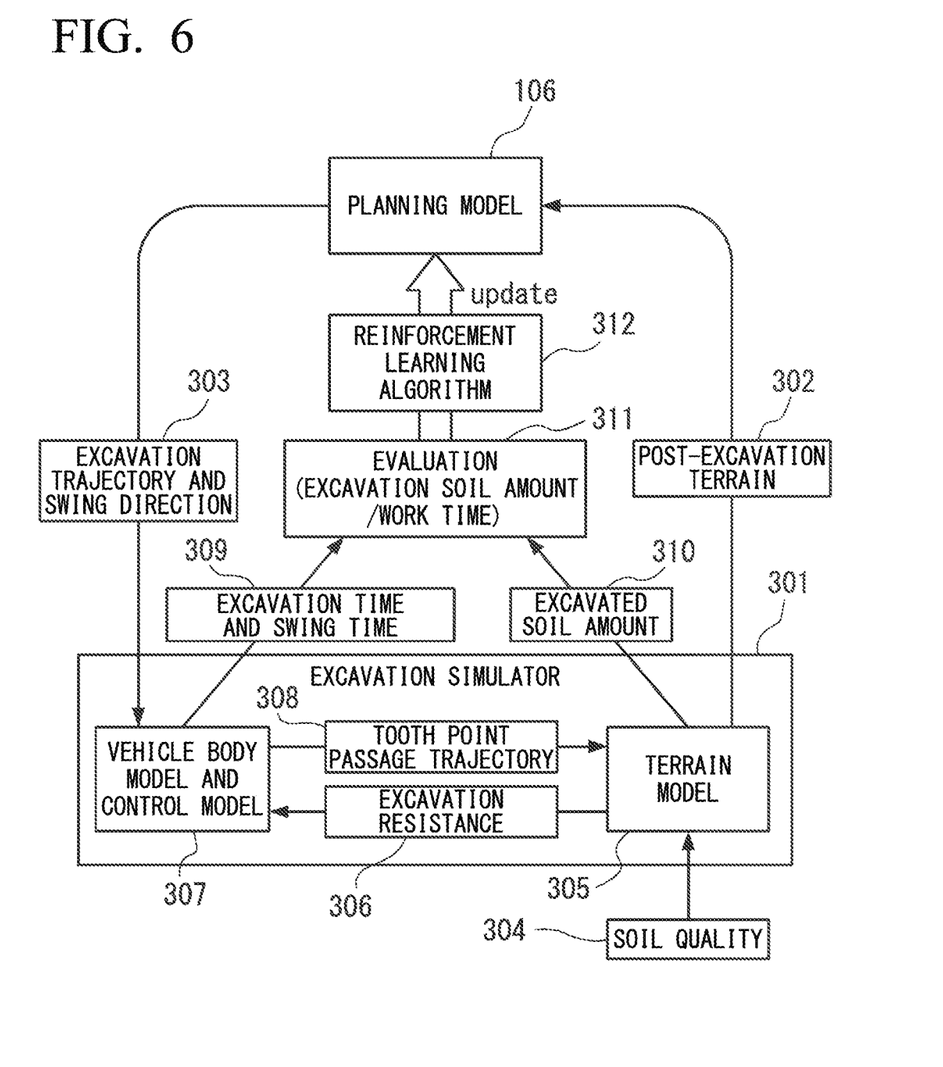
FIG. 6 is a schematic diagram showing an example of a learning method of a planning model 106 shown in FIG. 1.

FIG. 6 is a schematic diagram showing an example of the learning method of the planning model 106 shown in FIG. 1. In the example shown in FIG. 6, the planning model 106 performs machine learning through reinforcement learning. The planning model 106 receives, as an input, the terrain information (i.e., post-excavation terrain 302) generated by an excavation simulator 301, and inputs an output excavation trajectory and swing direction 303 to the excavation simulator 301. The excavation simulator 301 includes a terrain model 305, a vehicle body model and control model 307. The terrain model 305 receives, as an input, soil quality 304 as parameters and receives, as an input, a tooth point passage trajectory 308 to output the post-excavation terrain 302, excavation resistance 306, and an excavated soil amount 310. The vehicle body model and control model 307 receives, as an input, the excavation trajectory and swing direction 303 and the excavation resistance 306, and outputs the tooth point passage trajectory 308, an excavation time and swing time 309. A reinforcement learning algorithm 312 updates the planning model 106 through the method of the existing reinforcement learning algorithm by using the efficiency of the excavation work calculated in an evaluation 311 as an evaluation value. The efficiency of the excavation work can be obtained, for example, by dividing the excavated soil amount by the work time (=excavation time+ swing time). Further, in the evaluation 311, processing of increasing the evaluation value for the excavation that matches the target terrain (for example, the target value of the excavation range and the excavation shape) in the excavation plan and of decreasing the evaluation value for the excavation that does not match the target terrain is performed. The evaluation is performed as follows. For example, in a case where conditions are given for the target terrain that excavation outside the excavation range is prohibited (i.e., square dig) and that a slope of 60 degrees is left in front as much as possible, no reward is given for the excavation outside the excavation range and a reward of several to several tenths of the reward is given for the excavation that breaks the slope of 60 degrees within the excavation range. Then, the reward (i.e., evaluation value) is calculated. The terrain model 305 is a model in which at least one of the post-excavation terrain 302, the excavation resistance 306, and the excavated soil amount 310 changes in a case where the soil quality 304 changes. In the machine learning of one planning model 106, the value of soil quality 304 is fixed. In this case, each planning model 106 is a model corresponding to the value of the soil quality 304.

Further, the planned value calculation unit 104 selects a planning model 106 on the basis of the soil quality estimated by the soil quality estimation unit 101, inputs the terrain information acquired (i.e., output) by the terrain information acquisition unit 103 to the selected planning model 106, and calculates the planned value as the output of the planning model 106. At that time, the planned value calculation unit 104 selects, for example, a planning model 106 in which the excavation plan (i.e., target soil amount or target shape) set by the operator and the settings of the excavation plan (i.e., target soil amount or target shape) set at the time of learning are equal to each other.

Figure 3:
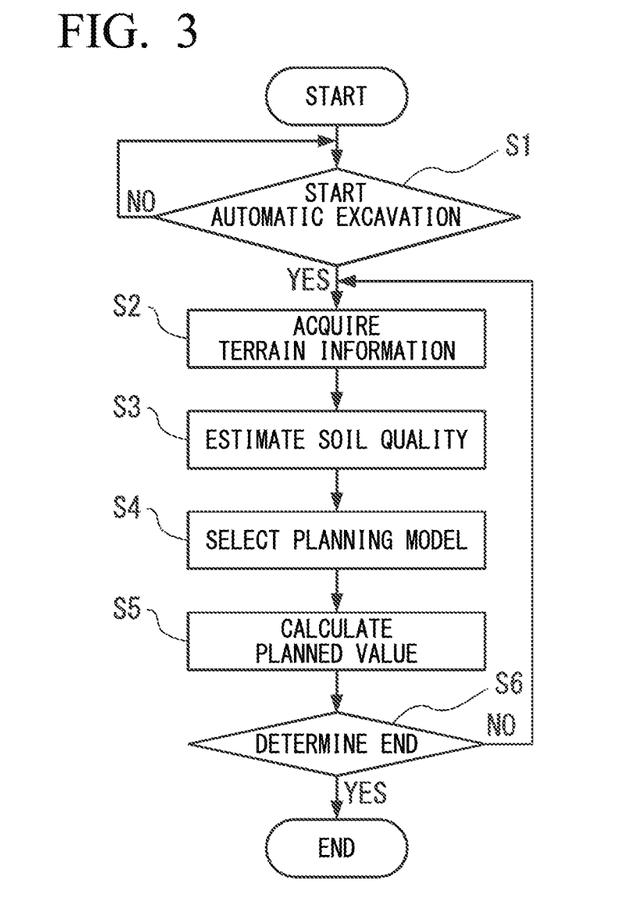
FIG. 3 is a flowchart showing an operation example of the excavation plan creation device 100 shown in FIG. 1.

Next, an operation example of the excavation plan creation device 100 shown in FIG. 1 will be described with reference to FIG. 3. FIG. 3 is a flowchart showing an operation example of the excavation plan creation device 100 shown in FIG. 1.

For example, when the operator of the hydraulic excavator 1 moves the hydraulic excavator 1 to the start position of excavation and adjusts the excavation direction in a predetermined direction, and then gives an instruction to start automatic excavation, the excavation plan creation device 100 thereafter repeatedly executes the processing of steps S2 to S6 at a predetermined cycle until the end condition of the automatic excavation is satisfied (i.e., until "YES" in step S6) ("start" to "YES" in step S1). In step S2, the terrain information acquisition unit 103 acquires one of the measured terrain information output by the terrain measurement unit 110 or the estimated terrain information output by the terrain information estimation unit 102, as the terrain information, and outputs the acquired terrain information to the planned value calculation unit 104. Next, the soil quality estimation unit 101 estimates the soil quality (step S3). Next, the planned value calculation unit 104 selects the planning model 106 from the storage unit 105 on the basis of the excavation plan (i.e., target soil amount or target shape) set by the operator and the soil quality (step S4). Next, the planned value calculation unit 104 inputs the terrain shape to the selected planning model 106, and calculates the planned value as the output of the planning model 106 (step S5). Next, the excavation plan creation device 100 (for example, the planned value calculation unit 104) determines whether or not the end condition is satisfied (for example, whether or not the excavation plan is completed) (step S6).

With the above processing, the excavation plan creation device 100 can automatically control the hydraulic excavator 1 on the basis of the excavation plan. At that time, since the planning model 106 is selected according to the soil quality, the influence of the soil quality can be appropriately considered when the excavation plan creation device 100 creates the excavation plan (i.e., calculates the planned value on the basis of the excavation plan).

Although the embodiment of the present disclosure has been described above with reference to the drawings, the specific configuration is not limited to the above embodiment, and design changes and the like within a range not departing from the spirit of the present disclosure are also included. For example, when creating the planning model 106, in addition to the soil quality, for example, the limit value of the excavation depth may be input to the vehicle body model and control model 307 as parameters. For example, in a case where reinforcement learning is performed by changing the soil quality to two types, that is, soil and sand, and the limit value of the excavation depth to three types, that is, 1 m, 80 cm, and 60 cm, six types of planning models 106 can be created. Further, the machine learning method is not limited to the reinforcement learning, and may be, for example, supervised learning. Further, instead of outputting the planned value calculated by the planned value calculation unit 104 to the control unit 120, the planned value may be output to a predetermined display unit in a display form that can be visually recognized as a target value by the operator.

Further, a part or all of the program executed by the computer in the above embodiment can be distributed via a computer-readable recording medium or a communication line.

It is possible to appropriately consider the influence of soil quality when creating an excavation plan.

The invention claimed is:

1. An excavation plan creation device, comprising:
a storage unit configured to store a plurality of planning models each of which is a machine learning model that receives, as an input, terrain information and that outputs a planned value of an excavation trajectory and a swing direction, the planning models having performed machine learning with parameters related to soil quality which are different from each other;
a soil quality estimation unit configured to estimate soil quality;
a terrain information acquisition unit configured to acquire terrain information; and
a planned value calculation unit configured to select the planning model on the basis of the soil quality estimated by the soil quality estimation unit, input the terrain information acquired by the terrain information acquisition unit to the selected planning model, and calculate the planned value as an output of the planning model,
the soil quality estimation unit being further configured to estimate soil quality based on a deviation between a planned trajectory of a tooth point position of a bucket, which is indicated by the planned value calculated by the planned value calculation unit, and an actual trajectory of a tooth point of the bucket.

2. The excavation plan creation device according to claim 1, wherein
the planning model has performed machine learning through reinforcement learning using excavation efficiency as an evaluation value.

3. The excavation plan creation device according to claim 1, further comprising
a terrain information estimation unit configured to estimate the terrain information on the basis of time-series data of a tooth point position of a bucket and a load of a work equipment that supports the bucket and the soil quality estimated by the soil quality estimation unit,
the terrain information acquisition unit being configured to acquire the terrain information estimated by the terrain information estimation unit.

4. A work machine, comprising:
the excavation plan creation device according to claim 1.

5. An excavation plan creation method, comprising:
storing a plurality of planning models each of which is a machine learning model that receives, as an input, terrain information and that outputs a planned value of an excavation trajectory and a swing direction, the planning models having performed machine learning with parameters related to soil quality which are different from each other by using excavation efficiency as an evaluation value;
estimating soil quality;
acquiring terrain information; and
selecting the planning model on the basis of the estimated soil quality, inputting the acquired terrain information to the selected planning model, and calculating the planned value as an output of the planning model,
estimating the soil quality includes estimating the soil quality based on a deviation between a planned trajectory of a tooth point position of a bucket, which is indicated by the planned value calculated by the calculating the planned value, and an actual trajectory of a tooth point of the bucket.

6. The excavation plan creation device according to claim 2, further comprising
a terrain information estimation unit configured to estimate the terrain information on the basis of time-series data of a tooth point position of a bucket and a load of a work equipment that supports the bucket and the soil quality estimated by the soil quality estimation unit,
the terrain information acquisition unit being configured to acquire the terrain information estimated by the terrain information estimation unit.

7. A work machine, comprising:
the excavation plan creation device according to claim 2.

8. A work machine, comprising:
the excavation plan creation device according to claim 3.

9. A work machine, comprising:
the excavation plan creation device according to claim 6.

\* \* \* \* \*